(12) United States Patent
Sakai et al.

(10) Patent No.: US 11,163,039 B2
(45) Date of Patent: Nov. 2, 2021

(54) RADAR APPARATUS

(71) Applicant: DENSO CORPORATION, Kariya (JP)

(72) Inventors: Toshiya Sakai, Nisshin (JP); Kazumasa Sakurai, Nisshin (JP); Asahi Kondo, Kariya (JP); Kazushi Kawaguchi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 317 days.

(21) Appl. No.: 16/320,232

(22) PCT Filed: Jul. 24, 2017

(86) PCT No.: PCT/JP2017/026708
§ 371 (c)(1),
(2) Date: Jan. 24, 2019

(87) PCT Pub. No.: WO2018/021244
PCT Pub. Date: Feb. 1, 2018

(65) Prior Publication Data
US 2019/0271762 A1 Sep. 5, 2019

(30) Foreign Application Priority Data

Jul. 26, 2016 (JP) .............................. JP2016-146410

(51) Int. Cl.
*G01S 7/03* (2006.01)
*G01S 13/04* (2006.01)
(Continued)

(52) U.S. Cl.
CPC ................ *G01S 7/032* (2013.01); *G01S 7/03* (2013.01); *G01S 13/04* (2013.01); *G01S 13/93* (2013.01);
(Continued)

(58) Field of Classification Search
CPC ...... G01S 7/032; G01S 7/32; G01S 2007/027; G01S 2007/27; G01S 13/931; H01Q 1/42;
(Continued)

(56) References Cited

U.S. PATENT DOCUMENTS 4,187,507 A * 2/1980 Crane .................. H01Q 19/062
342/376
8,193,994 B2 * 6/2012 Alamouti ........... H01Q 21/0031
343/753
(Continued)

FOREIGN PATENT DOCUMENTS

JP 57065901 A * 4/1982 ............... H01Q 1/42
JP 2004-312696 A 11/2004
(Continued)

*Primary Examiner* — Erin F Heard
*Assistant Examiner* — Michael W Justice
(74) *Attorney, Agent, or Firm* — Maschoff Brennan

(57) ABSTRACT

A radar apparatus that detects an object using radiated waves includes: an antenna surface that includes an element unit that emits a radiated wave for a radar; and a cover member that covers the antenna surface to protect the element unit. The cover member includes an inner refractive surface that is an inner side surface of the cover member on which an undesired wave is incident and is formed into a shape that refracts the undesired wave incident on the inner refractive surface so as to advance towards antenna rear. The antenna rear is a side opposite an antenna front that is a side on which the radiated wave is emitted, with the antenna surface as a boundary. Undesired waves are radiated waves that are emitted outside a range of a predetermined solid angle relative to a normal direction of the antenna surface from a center of the antenna surface from which the radiated waves are emitted.

14 Claims, 7 Drawing Sheets

(51) Int. Cl.
*G01S 13/931* (2020.01)
*H01Q 1/42* (2006.01)
*H01Q 15/02* (2006.01)
*G01S 13/93* (2020.01)
*H01Q 15/08* (2006.01)
*G01S 7/02* (2006.01)

(52) U.S. Cl.
CPC ............. *G01S 13/931* (2013.01); *H01Q 1/42* (2013.01); *H01Q 15/02* (2013.01); *H01Q 15/08* (2013.01); *G01S 7/027* (2021.05)

(58) Field of Classification Search
CPC ........ H01Q 15/02; H01Q 15/08; H01Q 19/06; H01Q 19/062; H01Q 19/62; H01Q 19/08; H01Q 15/0013
USPC ............................... 342/27; 343/753, 909, 27
See application file for complete search history.

(56) References Cited

U.S. PATENT DOCUMENTS

| | | | |
|---|---|---|---|
| 8,681,064 B2* | 3/2014 | Isom | H01Q 15/0013 |
| | | | 343/753 |
| 9,163,974 B1 | 10/2015 | Kekalainen | |
| 9,941,585 B2* | 4/2018 | Liu | H01Q 1/42 |
| 2004/0227663 A1 | 11/2004 | Suzuki et al. | |
| 2015/0295308 A1* | 10/2015 | Liu | H01Q 1/42 |
| | | | 343/841 |
| 2018/0164430 A1* | 6/2018 | Kuriyama | H01Q 15/08 |

FOREIGN PATENT DOCUMENTS

| | | |
|---|---|---|
| JP | 2007-057483 A | 3/2007 |
| JP | 2015-200512 A | 11/2015 |
| JP | 2016-072806 A | 5/2016 |
| JP | 2016-116219 A | 6/2016 |

* cited by examiner

RADAR APPARATUS

CROSS-REFERENCE TO RELATED APPLICATIONS

The present application is a national stage application of PCT Application No. PCT/JP2017/026708, filed on Jul. 24, 2017, which claims the benefit of priority to Japanese Patent Application No. 2016-146410, filed on Jul. 26, 2016 to the Japan Patent Office, the descriptions of which are incorporated herein by reference.

TECHNICAL FIELD

The present disclosure relates to a radar apparatus that detects an object using radiated waves.

BACKGROUND ART

A millimeter-wave radar that is used for the purpose of automatic driving, collision avoidance, and the like of a vehicle is known. The millimeter-wave radar is a radar that detects an object present in a detection area that is an area within a predetermined angle, by emitting a millimeter wave and receiving a reflected wave of the millimeter wave. At this time, if an undesired wave that leaks outside a predetermined angle is present, the undesired wave may be reflected by an object that reflects the millimeter wave, and erroneous detection may occur as a result of the radar receiving the reflected undesired wave.

In this regard, for example, PTL 1 proposes a technology in which undesired waves are suppressed by a material having a large dielectric loss being provided as a radio-wave absorbing layer in a portion of a cover member through which the undesired waves pass.

CITATION LIST

Patent Literature

[PTL 1] JP-A-2004-312696

SUMMARY OF INVENTION

However, as a result of detailed examination by the inventors, an issue has been found in that, to provide the radio-wave absorbing layer, the material having a large dielectric loss is required to be combined with the cover member, and materials and manufacturing process for the radio-wave absorbing layer become complex.

An aspect of the present invention is to provide a technology for a radar apparatus that reduces erroneous detection without being provided with a radio-wave absorbing layer.

An exemplary embodiment of the present disclosure is a radar apparatus that detects an object using radiated waves. The radar apparatus includes: an antenna surface that includes an element unit that emits radiated waves for a radar; and a cover member that covers the antenna surface to protect the element unit. The cover member includes an inner refractive surface that is an inner side surface of the cover member on which undesired waves are incident and is formed into a shape that refracts undesired waves incident on the inner refractive surface so as to direct them towards antenna rear. The antenna rear is a side opposite an antenna front that is a side on which the radiated wave is emitted, with the antenna surface as a boundary. Undesired waves are radiated waves that are emitted outside a range of a predetermined solid angle relative to a normal direction of the antenna surface from a center of the antenna surface from which the radiated waves are emitted.

As a result of such a configuration, the undesired waves are refracted further outside the area detected by the radar apparatus. As a result, a direction in which the undesired waves are emitted is shifted further outward than a millimeter wave that is emitted within a detection area, that is, so as to be more parallel to the antenna surface. Consequently, detection of the reflected undesired waves by the radar apparatus can be suppressed. Erroneous detection can be reduced without a radio-wave absorbing layer being provided.

DESCRIPTION OF EMBODIMENTS

Embodiments of the present disclosure will hereinafter be described with reference to the drawings.

1. First Embodiment

[1-1. Configuration]

A radar apparatus 1 according to the present embodiment is mounted in a vehicle. The radar apparatus 1 emits a radiated wave that is a radio wave of a predetermined frequency and receives a reflected wave from an object that reflects the radiated wave. For example, the radar apparatus 1 is set inside a bumper portion on a vehicle front surface.

Figure 1:
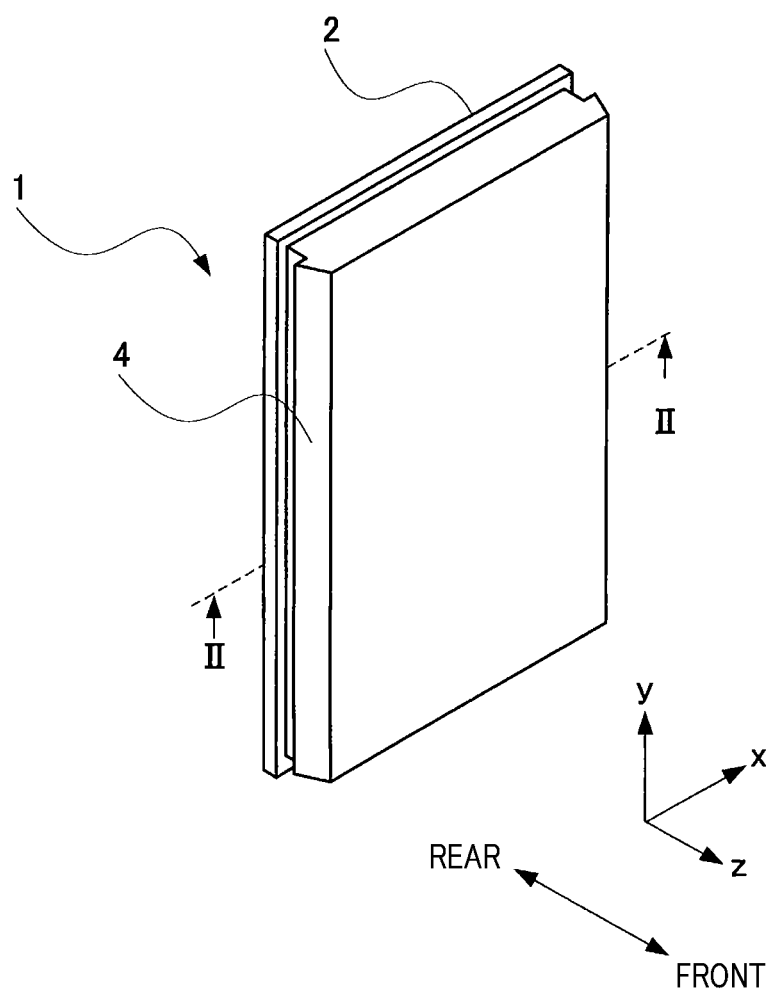
FIG. 1 is a perspective view of a radar apparatus.
Figure 2:
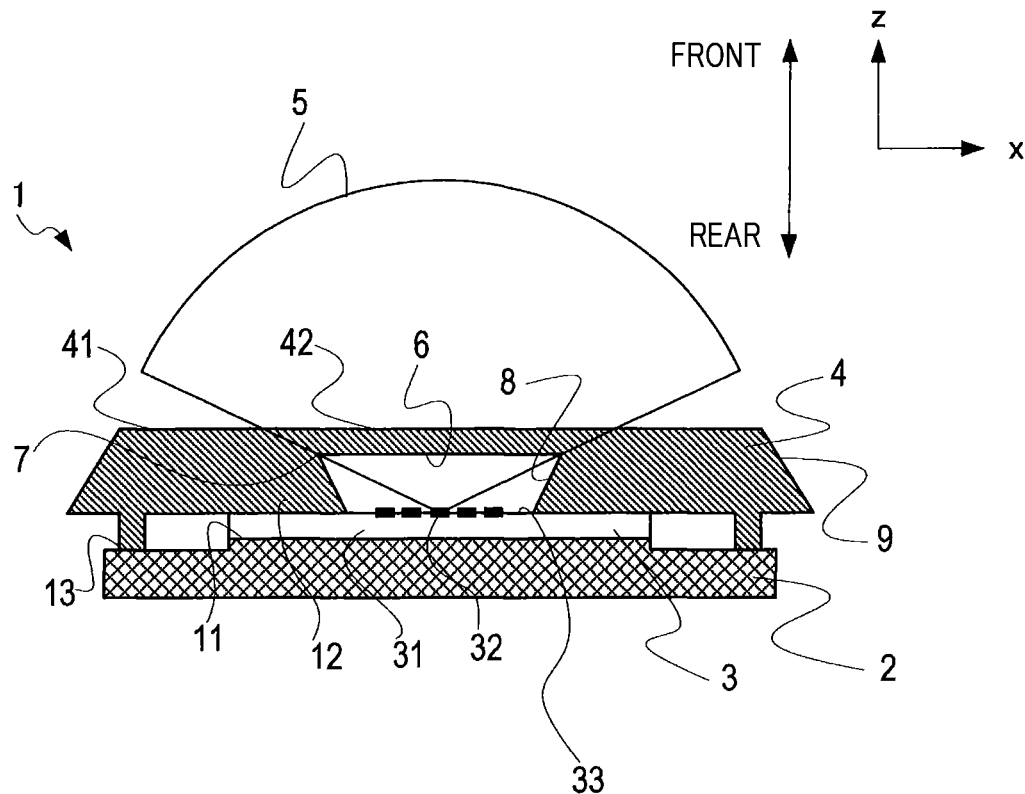
FIG. 2 is a cross-sectional view of the radar apparatus taken along line II-II in FIG. 1.

As shown in FIG. 1 and FIG. 2, the radar apparatus 1 includes a casing 2, an element unit 3, and a cover member 4.

The casing 2 is composed of a metal material. The casing 2 houses a radar main body that detects an object that is present in the periphery of the vehicle using the radar apparatus 1. A portion of the casing 2 is shown in FIG. 1 and FIG. 2. The radar main body includes therein a transmission and reception circuit that transmits and receives the radiated wave and the reflected wave via the element unit 3, a signal processing unit that determines information related to the object that has reflected the radiated wave, including at least a distance to the object, by processing a reception signal acquired by the transmission and reception circuit, and the like.

The element unit 3 includes a rectangular circuit board 31. A plurality of antenna elements 32 that transmit and receive the radio wave are formed on one surface of the circuit board 31. Hereafter, the surface of the circuit board 31 on which the antenna elements 32 are formed is referred to as an antenna surface 33. In addition, a surface of the circuit board 31 opposite the antenna surface 33 is fixed to the casing 2, and the casing 2 acts as ground.

An axis that is perpendicular to the surface of the circuit board 31 at this time is a z-axis. Coordinate axes perpendicular to the z-axis are respectively an x-axis and a y-axis. In addition, the x-axis and the y-axis are perpendicular to each other. A short-side direction of the circuit board 31 is the x-axis and a long-side direction is the y-axis. Hereafter, a positive direction on the z-axis, that is, a direction in which the radio wave is emitted is also referred to as front. A negative direction on the z-axis is also referred to as rear. Furthermore, with the antenna surface 33 as a boundary, the side on which the radiated wave is emitted is antenna front and the side opposite thereof is antenna rear.

The plurality of antenna elements 32 are two-dimensionally arrayed on the circuit board 31 along each of the x-axis direction and the y-axis direction in FIG. 1 and FIG. 2. In addition, the plurality of antenna elements 32 that are arrayed in a single row along the y-axis direction in FIG. 1, that is, a depth direction in FIG. 2 configure an array antenna. That is, the element unit 3 has a structure in which a plurality of array antennas are arrayed along the x-axis direction in the drawings.

When the radar apparatus 1 is mounted in the vehicle, the radar apparatus 1 is attached such that the y-axis direction coincides with a vehicle-height direction, the x-axis direction coincides with a horizontal direction, and the z axis direction coincides with a center direction of a detection area 5. The detection area 5 referred to herein is an area within a certain solid angle from the center of the antenna surface. Of radiated waves, detection waves are emitted as waves for detecting objects.

In addition, of the plurality of array antennas, any single array antenna is used as a transmission antenna. The array antennas other than the single array antenna are used as a reception antenna. However, the quantities of the transmission antenna and the reception antenna are not limited thereto. For example, all of the antennas may be used as the transmission antenna or the reception antenna. In addition, the arrangement of the array antenna used as the transmission antenna and the array antenna used as the reception antenna can be arbitrarily set.

The cover member 4 is composed of a dielectric body that allows the radio waves transmitted and received by the element unit 3 to pass at low loss. The cover member 4 has a cuboid outer shape and has a shape of a box of which one face is open.

The cover member 4 is fixed to the casing 2 such that the opening is covered by the casing 2. The cover member 4, together with the casing 2, forms a space for housing the element unit 3, and thereby protects the antenna surface 33 of the element unit 3. At this time, the casing 2 and the circuit board 3 are fixed by a board fixing surface 11. A front surface of the circuit board 3 and the cover member 4 are fixed by a cover setup surface 12. In addition, the cover member 4 and the casing 2 are fixed by a cover fixing surface 13. A transmissive surface 6 and an inner refractive surface 8 are provided on an inner side of the cover member 4.

As shown in FIG. 2, the transmissive surface 6 is positioned at the antenna front when fixed to the casing 2, on a surface on the inner side of the cover member 4 that forms the space for housing the element unit 3 by the cover member 4 and the casing 2. That is, the transmissive surface 6 is a surface of the cover member 4 through which the radiated wave passes. The transmissive surface 6 is a portion of the surface opposing the antenna surface 33 that overlaps the detection area 5 that is an area within a predetermined angle from the center of the element unit.

A portion of the cover member 4 that overlaps the detection area 5 is referred to as a transmissive area 42. A point that indicates a boundary between the transmissive surface 6 and the inner refractive surface 8 on a cross-section that is perpendicular to an extending direction of the inner refractive surface 8 is an upper contact point 7. The inner refractive surface 8 is a planar-shaped side surface that spreads outward towards the antenna front, when viewed from the antenna surface 33, and is sloped so as to come into contact with the transmissive surface 6 at the upper contact point 7.

In addition, an outer side surface on a side opposite the inner refractive surface 8 with the cover member 4 therebetween is an outer refractive surface 9.

The outer refractive surface 9 is sloped such that the cover member 4 is narrowed towards the antenna front when viewed from the antenna surface 33. The inner refractive surface 8 and the outer refractive surface 9 refract an incident undesired wave. The undesired wave referred to herein refers to a radiated wave that is not a detection wave, that is, a radiated wave that is emitted outside the detection area 5 and is not used for detection of an object.

The incident undesired wave is deflected so as to direct it towards a direction in which the angle becomes greater, compared to a direction in which the undesired wave is emitted by being refracted by the inner refractive surface 8 and the outer refractive surface 9, and compared to a direction in which the undesired wave is emitted relative to a normal direction of the antenna surface 33 facing the antenna front.

That is, the undesired wave refracted by the inner refractive surface 8 propagates inside the cover member 4 so as to become parallel to the antenna surface 33. The propagated undesired wave is refracted by the outer refractive surface and, as a result, the inner refractive surface 8 and the outer refractive surface 9 deflect the undesired wave at an angle so as to direct it towards the antenna rear as a result of refraction. A cover front surface 41 that is an outer front surface of the cover member 4 is provided to be flat, so as to be parallel to the antenna surface 33 and the transmissive surface 6.

[1-2. Workings]

In the cover member 4 configured as described in detail above, the transmissive surface 6 transmits the detection wave. The inner refractive surface 8 refracts the undesired wave. The undesired wave refracted by the inner refractive surface 8 is refracted further towards the outer side from the center of the element unit 3 relative to the direction away from the detection area 5, that is, the direction of emission by the element unit 3. That is, the undesired wave is refracted so as to propagate parallel with the antenna surface 33. The refracted undesired wave is refracted again by the outer refractive surface 9 and emitted outside the cover member 4. Because the outer refractive surface 9 is sloped, the undesired wave that is refracted again by the outer refractive surface is emitted to the rear of the antenna surface as a result of the slope.

Figure 3:
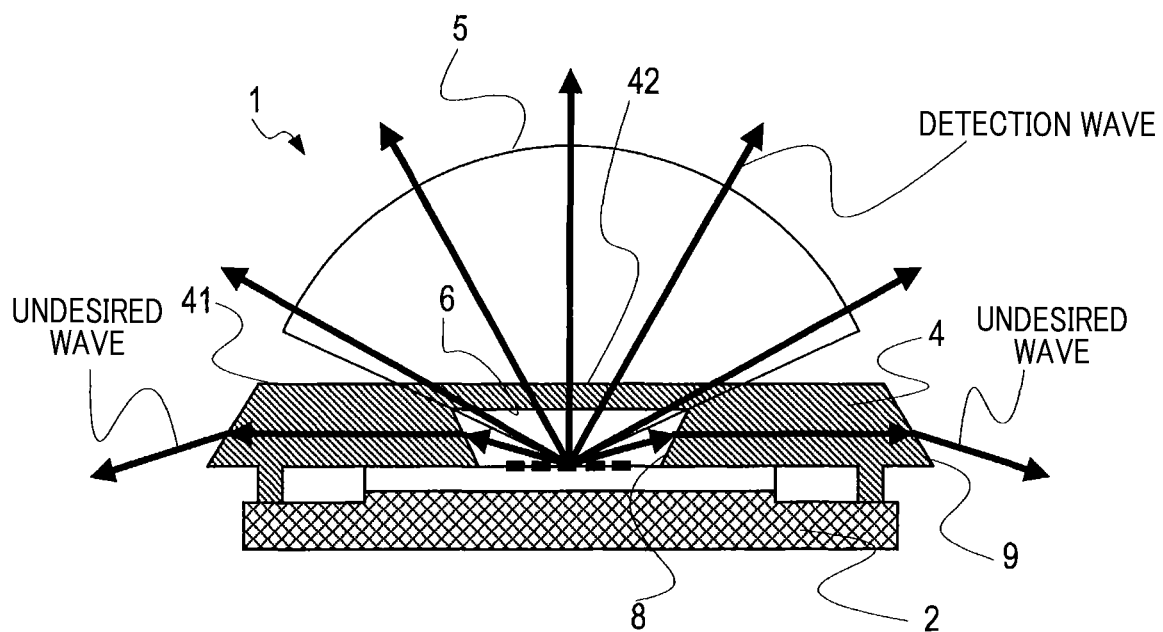
FIG. 3 is a diagram of the workings of a side surface of the cover member.

As a result of the radar apparatus 1 configured in this manner, as shown in FIG. 3, the detection wave emitted from the element unit 3 is emitted without passing through the side surface portion of the cover member 4. The reflected wave of the detection wave reaches the element unit 3 without passing through the side surface portion of the cover member 4.

[1-3. Effects]

According to the first embodiment described in detail above, the following effects are achieved.

As described above, in the radar apparatus 1, the undesired wave is refracted towards the rear of the radar apparatus 1 by the side surface portion of the cover member 4. Consequently, multipath caused by the undesired wave can be suppressed and erroneous detection can be suppressed.

Figure 4:
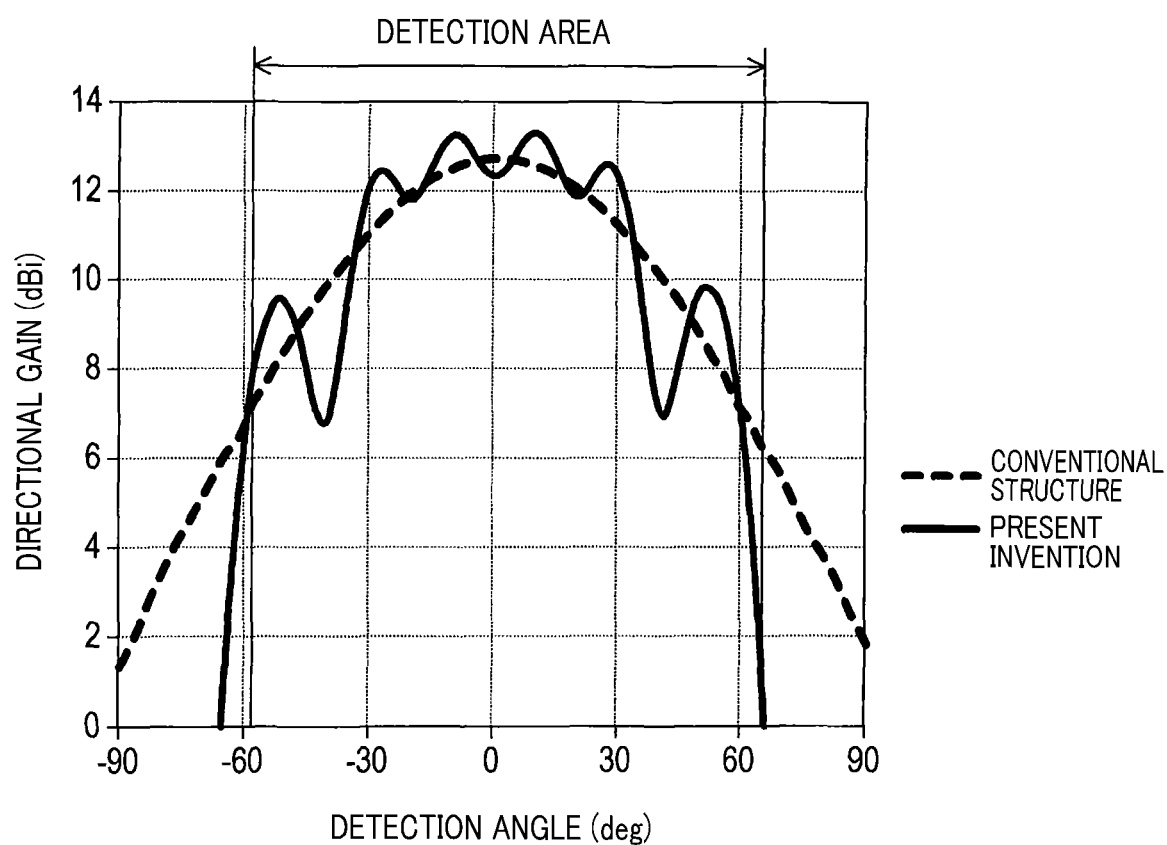
FIG. 4 is a graph of the gain of an antenna relative to a detection angle.
Figure 5:
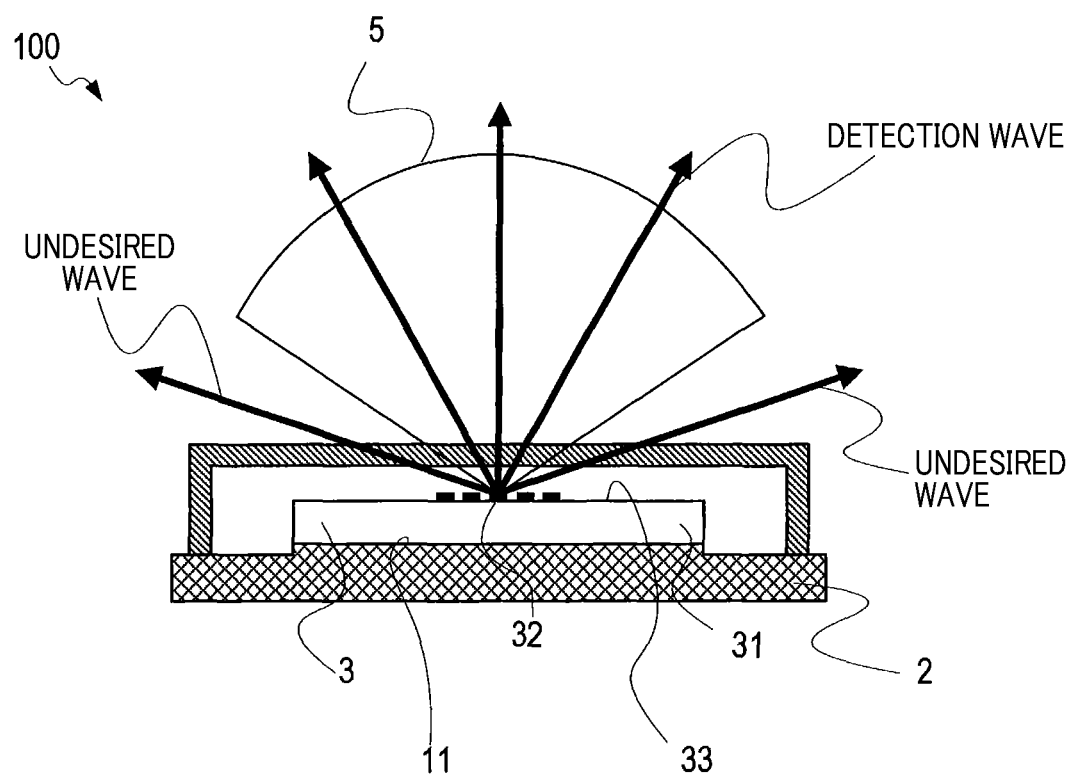
FIG. 5 is a diagram of a radar apparatus of a conventional structure in which the side surface of the cover member does not come into contact with a detection area.

As shown in FIG. 4, it is clear that directional gain outside the detection area 5, among detection angles, is reduced in the radar apparatus 1 according to the present embodiment indicated by a solid line, compared to a radar apparatus of a conventional structure indicated by a dotted line. That is, it is indicated that, in the structure according to the present embodiment, detection of undesired waves can be suppressed. Here, as shown in FIG. 5, a radar apparatus 100 of a conventional structure referred to herein differs from the radar apparatus 1 according to the present embodiment in that a refractive structure is not provided on the side surface.

As a result, in the radar apparatus 100 of the conventional structure, the undesired wave linearly advances in the emission direction in a manner identical to the detection wave, without being refracted.

2. Second Embodiment

[2-1. Configuration]

A basic configuration according to a second embodiment is similar to that according to the first embodiment. Therefore, differences will be described below. Reference numbers that are the same as those according to the first embodiment indicate the same configurations, and the preceding descriptions are referenced.

Figure 6:
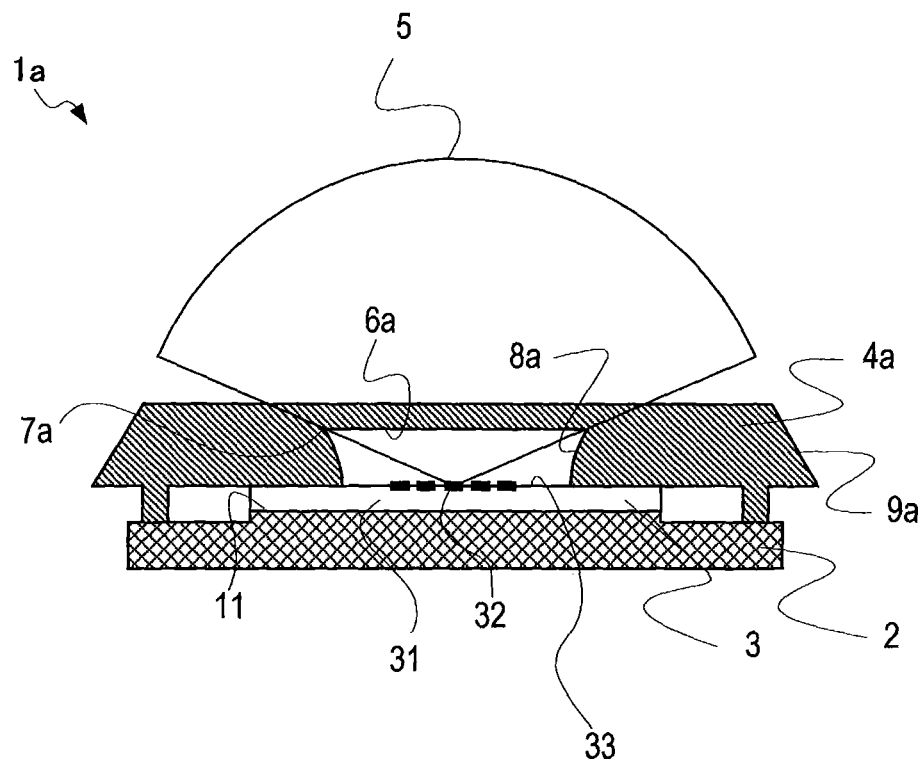
FIG. 6 is a cross-sectional view of the radar apparatus in a modified example.

In the above-described radar apparatus 1 according to the first embodiment, the inner refractive surface 8 of the cover member 4 is a planar-shaped side surface. However, as shown in FIG. 6, in a radar apparatus 1a according to the second embodiment, an inner refractive surface 8a of a cover member 4a is formed to be a curved surface that has a convex shape towards a space formed by the antenna surface 33 and the cover member 4a. That is, the cover member 4 according to the first embodiment and the cover member 4a according to the second embodiment differ in that the shape differs.

The inner refractive surface 8a is designed to be a curved surface that has a center of curvature on a same plane as the antenna surface 33 and is prescribed by a radius of curvature R. That is, the inner refractive surface 8a is in the shape of a spherical surface or a side surface of a circular column. As a result, the inner refractive surface 8a is a curved surface of which the slope relative to the antenna surface 33 becomes gentler towards the antenna front.

A method for designing the radius of curvature R prescribing the curved-surface shape of the inner refractive surface 8a will be described. Here, a case in which the design is made such that an undesired wave incident on the inner refractive surface 8a is refracted by the inner refractive surface 8a and advances inside the cover member 4a so as to be substantially parallel to the antenna surface 33 will be described.

Figure 7:
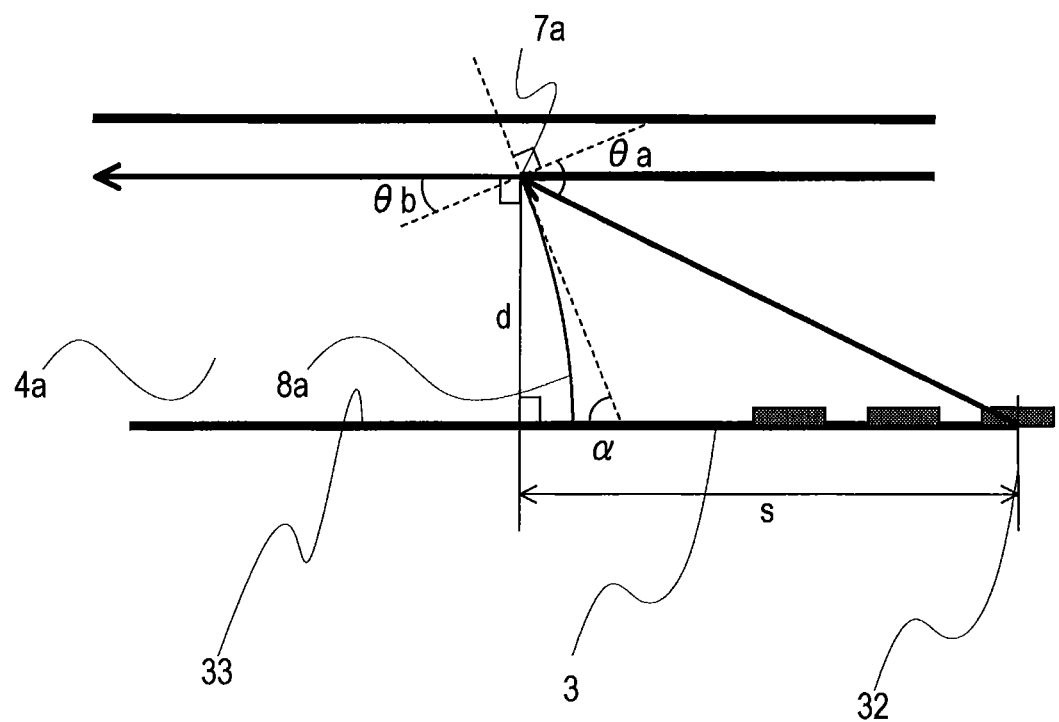
FIG. 7 is a cross-sectional view of a transmission direction of an undesired wave in the radar apparatus of the modified example.

As shown in FIG. 7, an angle formed by a tangent of the inner refractive surface 8a at an upper contact point 7a that is a boundary between a transmissive surface 6a and the inner refractive surface 8a, and the antenna surface 33 is α, and a relative permittivity of the cover member 4a is εr. In addition, a distance from the transmissive surface 6a to the antenna surface 33 is d, and a distance from a point at which a perpendicular lowered from the upper contact point 7a to the antenna surface 33 and the antenna surface 33 intersect to the center of the element unit 3 is s.

Furthermore, an acute angle formed by a line connecting the center of the element unit 3 and the upper contact point 7a and a normal direction of the inner refractive surface 8a at the upper contact point 7a is an angle θa, and a refraction angle of the undesired wave when the undesired wave is incident on the inner refractive surface 8a at the angle θa at the upper contact point 7a is an angle θb.

Relationships indicated in expressions (1) to (3) are established among the angle θa, the angle θb, the angle α, the relative permittivity εr of the cover member 4a, the distance d, and the distance s. The angle α can be determined from Formula 1 when the distance d, the distance s, and the relative permittivity εr are determined. In addition, the radius of curvature R of a curved surface of which the center of curvature is placed on the same plane as the antenna surface 33 and the angle formed by the tangent at the upper contact point 7a and the antenna surface is the angle α can be determined by expression (4). Here, the distance from the upper contact point 7a to the antenna surface 33 and the distance from the transmissive surface 6a to the antenna surface 33 are the same.

[Formula 1]

$$\sin\theta a = \sqrt{\varepsilon r} \sin\theta b \quad (1)$$

$$\theta a = \left(180 - \alpha - \arctan\left(\frac{s}{d}\right)\right) \quad (2)$$

$$\theta b = \sqrt{\varepsilon r} \sin(90 - \alpha) \quad (3)$$

$$R = \frac{d}{\cos\alpha} \quad (4)$$

[2-2. Workings]

The refractive index of the inner refractive surface 8a is greater than the refractive index of air. Therefore, the angle θb is smaller than the angle θa. The angle formed by the advancing direction of the undesired wave incident on the inner refractive surface 8a and the antenna surface 33 increases towards the antenna front. According to the present embodiment, the slope of the inner refractive surface 8a relative to the antenna surface 33 becomes gentler towards the antenna front. As a result, the undesired wave refracted by the inner refractive surface 8a can be refracted such that the angle relative to the antenna surface 33 is more uniformly substantially parallel to the antenna surface 33.

[2-3. Effects]

The undesired wave is refracted by the inner refractive surface 8a and propagated inside the cover member 4a. At this time, according to the present embodiment, the undesired wave is refracted so as to be more uniformly parallel to the antenna surface 33. Therefore, the undesired wave more easily reaches the outer refractive surface 9a, and the undesired wave refracted by the outer refractive surface 9a more easily advances around towards the antenna rear.

Consequently, detection of the undesired waves can be further suppressed, compared to the first embodiment.

3. Other Embodiments

Embodiments of the present disclosure are described above. However, the present disclosure is not limited to the above-described embodiments and may be carried out with various modifications.

Figure 8:
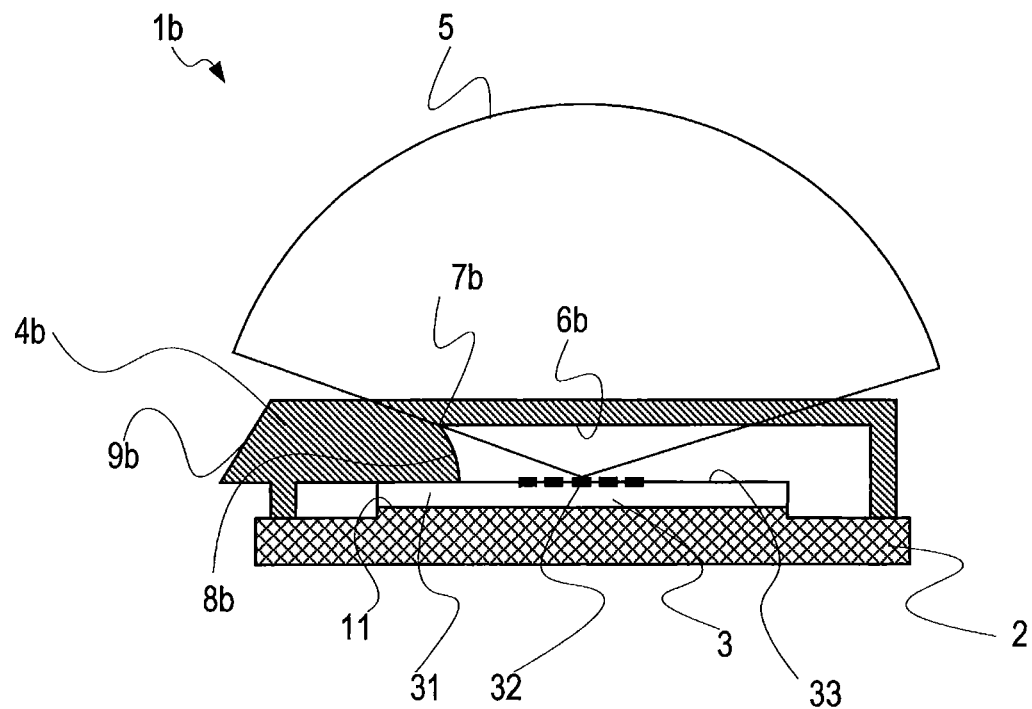
FIG. 8 is a cross-sectional view of the radar apparatus in a modified example.

(3a) The inner side surface of the cover member is not limited to that in which all inner side surfaces have a structure such as the inner refractive surface according to each of the above-described embodiments. For example, a configuration in which the effects of undesired waves are suppressed regarding a specific direction and not suppressed regarding other directions is also possible. Specifically, as in a radar apparatus 1b shown in FIG. 8, among the inner side surfaces of a cover member 4b, a portion may have a sloped shape similar to the inner refractive surface 8b, and the other portions may have a shape that is not sloped. A transmissive surface 6b, an upper contact point 7b, and an outer refractive surface 9b at this time may be similar to the transmissive surface according to each of the above-described embodiments.

(3b) According to each of the above-described embodiments, the outer refractive surface is sloped such that the cover member 4 is narrowed towards the antenna front when viewed from the antenna surface 33. However, the shape of the outer refractive surface is not limited thereto. For example, the outer refractive surface may be provided with a curved surface that has a convex face on the outer side, and if the undesired waves advance towards the antenna rear, the slope is not required.

Figure 9:
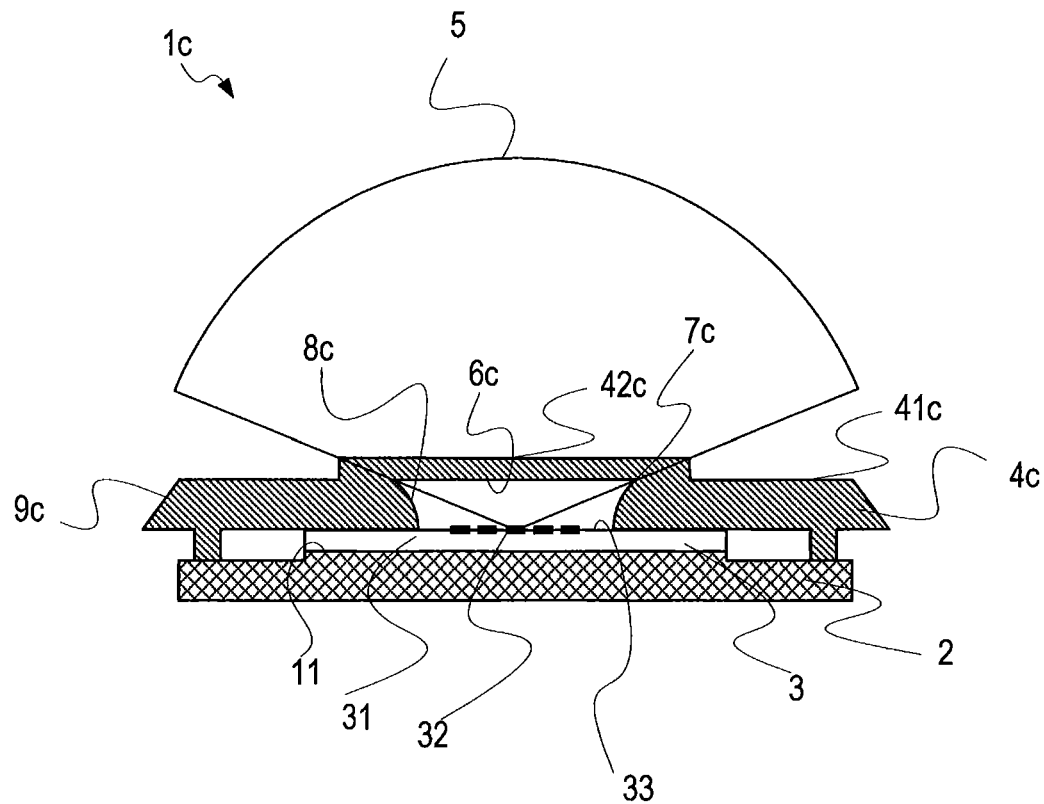
FIG. 9 is a cross-sectional view of the radar apparatus in a modified example.

(3c) According to each of the above-described embodiments, the cover front surface is flat. However, the shape of the cover front surface is not limited thereto. That is, the position of the transmissive area need not be a position at which the surface is the same as the cover front surface. For example, as in a radar apparatus 1c shown in FIG. 9, the structure may be such that a transmissive surface 6c of a cover member 4c protrudes compared to a cover surface 41c. In this case, an upper contact point 7c may be positioned at a position higher than that according to the above-described embodiments relative to the antenna surface.

Figure 10:
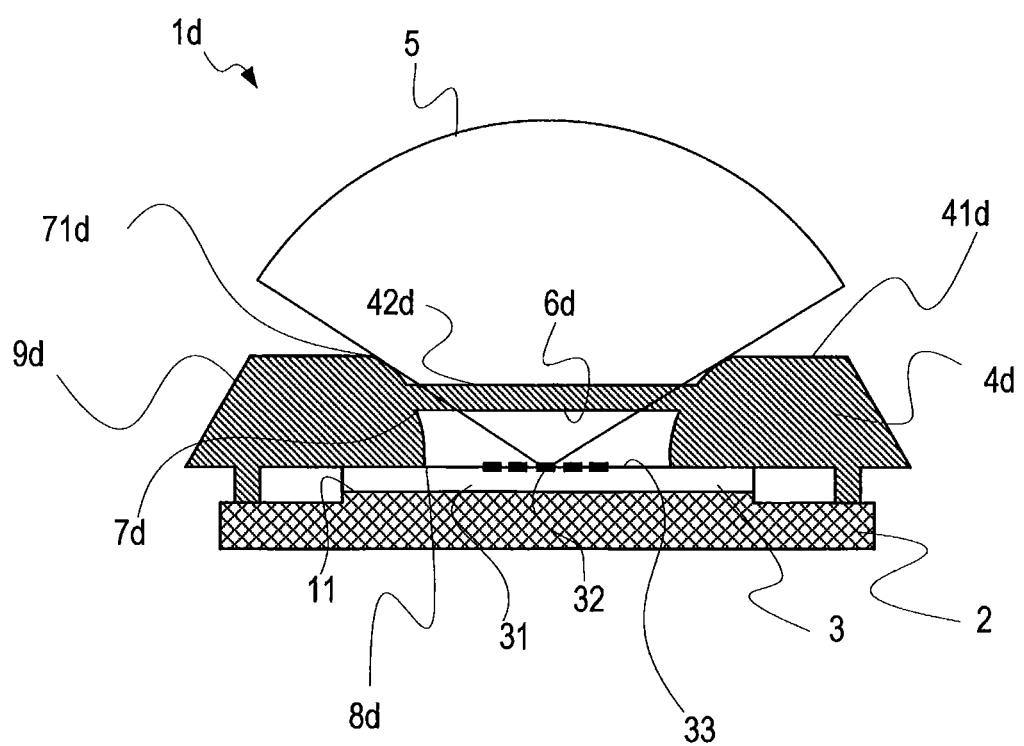
FIG. 10 is a cross-sectional view of the radar apparatus in a modified example.

In addition, as in a radar apparatus 1d shown in FIG. 10, the structure may be such that a transmissive surface 6d of a cover member 4d is recessed in comparison to a cover surface 41d. In this case, an upper contact point 7d may be positioned at a position lower than that according to the above-described embodiments relative to the antenna surface. Furthermore, an inner refractive surface 8d may be shaped in an extending manner with the transmissive surface 6d in a sandwiched state. A boundary of the detection area 5 may be a contact point 71d between the inner refractive surface 8d and the cover front surface 41d, instead of the upper contact point 7d. Outer refractive surfaces 9c and 9d may be similar to that according to the above-described embodiments.

(3d) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiments may be omitted. Moreover, at least a part of a configuration according to an above-described embodiment may be added to or replace a configuration according to another of the above-described embodiments. Any mode included in the technical concept specified by the wordings of the scope of claims is an embodiment of the present disclosure.

The invention claimed is:

1. A radar apparatus that detects an object using radiated waves, the radar apparatus comprising:
an antenna surface that includes an element unit that includes a plurality of antenna elements and emits radiated waves for a radar; and
a cover member that covers the antenna surface to protect the element unit, the cover member including an inner refractive surface and an outer refractive surface wherein the inner refractive surface is an inner side surface of the cover member on which undesired waves are incident and propagated substantially parallel to the antenna surface and the outer refractive surface is formed into a shape that refracts the undesired waves incident on the inner refractive surface so as to direct them towards an antenna rear,
the antenna rear being a side opposite an antenna front that is a side on which the radiated wave is emitted, with the antenna surface as a boundary, and
the undesired waves being radiated waves that are emitted outside a range of a predetermined solid angle relative to a normal direction of the antenna surface from a center of the antenna surface from which the radiated waves are emitted, wherein the predetermined solid angel corresponds to a detection area.

2. The radar apparatus according to claim 1, wherein:
at least a portion of the inner refractive surface has a shape that is sloped such that a space formed by the antenna surface and the cover member widens from the antenna surface towards the antenna front.

3. The radar apparatus according to claim 2, wherein:
at least a portion of the inner refractive surface is formed into a curved surface that has a convex shape towards a space formed by the antenna surface and the cover member.

4. The radar apparatus according to claim 3, wherein:
the cover member satisfies a relationship in an expression below $$R = \frac{d}{\cos\alpha}$$

where:
R is a radius of curvature of the inner refractive surface of the cover member;
d is a distance from a transmissive surface to the antenna surface, the transmissive surface being a surface of the cover member through which the radiated wave passes; and
α is an angle formed by a tangent of the inner refractive surface that passes through an upper contact point and the antenna surface, the upper contact point being a point indicating a boundary between the transmissive surface and the inner refractive surface on a cross-section that is perpendicular to an extending direction of the inner refractive surface.

5. The radar apparatus according to claim 3, wherein:
the curved surface has a shape of a spherical surface or a side surface of a circular column; and the cover member satisfies a relationship in an expression below $$\sin\theta a = \sqrt{\varepsilon r} \sin\theta b$$
$$\theta a = \left(180 - \alpha - \arctan\left(\frac{s}{d}\right)\right)$$
$$\theta b = \sqrt{\varepsilon r} \sin(90 - \alpha)$$

where:
d is a distance from a transmissive surface to the antenna surface, the transmissive surface being a surface of the cover member through which the radiated wave passes;
α is an angle formed by a tangent of the inner refractive surface that passes through an upper contact point and the antenna surface, the upper contact point being a point indicating a boundary between the transmissive surface and the inner refractive surface on a cross-section that is perpendicular to an extending direction of the inner refractive surface;
s is a distance from a point at which a perpendicular that is lowered from the upper contact point to the antenna surface and the antenna surface intersect, to the center of the element unit;
θa is an angle that is an acute angle formed by a line connecting the center of the element unit and the upper contact point and a normal direction of the inner refractive surface at the upper contact point;
θb is an angle that is a refraction angle of the undesired wave when the undesired wave is incident on the inner refractive surface at the angle θa at the upper contact point; and
εr is a relative permittivity of the cover member.

6. The radar apparatus according to claim 3, wherein:
the inner refractive surface has a curved surface of which a radius of curvature is such that the incident undesired waves are refracted in a direction so as to be parallel to the antenna surface, and at least a portion of an outer side surface of the cover member is formed into a shape that refracts the undesired waves propagated in the cover member in a direction towards the rear of the antenna surface.

7. The radar apparatus according to claim 6, wherein:
at least a portion of an outer front surface of the cover member is formed into a shape that is sloped inward from a side close to the antenna surface towards a side far from the antenna surface, so as to refract the undesired waves propagated in the cover member such that the undesired waves are emitted further towards an outer side relative to the antenna surface, relative to an angle at which the undesired waves are incident on the outer front surface.

8. The radar apparatus according to claim 7, wherein:
the outer front surface of the cover member is formed to at least partially include a curved surface that is convex towards an outer side relative to the center of the antenna surface.

9. The radar apparatus according to claim 4, wherein:
the inner refractive surface has a curved surface of which a radius of curvature is such that the incident undesired waves are refracted in a direction so as to be parallel to the antenna surface, and at least a portion of an outer side surface of the cover member is formed into a shape that refracts the undesired waves propagated in the cover member in a direction towards the rear of the antenna surface.

10. The radar apparatus according to claim 9, wherein:
at least a portion of an outer front surface of the cover member is formed into a shape that is sloped inward from a side close to the antenna surface towards a side far from the antenna surface, so as to refract the undesired waves propagated in the cover member such that the undesired waves are emitted further towards an outer side relative to the antenna surface, relative to an angle at which the undesired waves are incident on the outer front surface.

11. The radar apparatus according to claim 10, wherein:
the outer front surface of the cover member is formed to at least partially include a curved surface that is convex towards an outer side relative to the center of the antenna surface.

12. The radar apparatus according to claim 5, wherein:
the inner refractive surface has a curved surface of which a radius of curvature is such that the incident undesired waves are refracted in a direction so as to be parallel to the antenna surface, and at least a portion of an outer side surface of the cover member is formed into a shape that refracts the undesired waves propagated in the cover member in a direction towards the rear of the antenna surface.

13. The radar apparatus according to claim 12, wherein:
at least a portion of an outer front surface of the cover member is formed into a shape that is sloped inward from a side close to the antenna surface towards a side far from the antenna surface, so as to refract the undesired waves propagated in the cover member such that undesired waves are emitted further towards an outer side relative to the antenna surface, relative to an angle at which the undesired waves are incident on the outer front surface.

14. The radar apparatus according to claim 13, wherein:
the outer front surface of the cover member is formed to at least partially include a curved surface that is convex towards an outer side relative to the center of the antenna surface.

* * * * *